(12) United States Patent
Mui et al.

(10) Patent No.: US 7,532,801 B2
(45) Date of Patent: May 12, 2009

(54) IMAGING DEVICE ILLUMINATION SYSTEM

(75) Inventors: Paul K. Mui, Boise, ID (US); C. Greg Kelsay, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/732,903

(22) Filed: Apr. 5, 2007

(65) Prior Publication Data
US 2008/0247189 A1      Oct. 9, 2008

(51) Int. Cl.
G02B 6/00          (2006.01)
(52) U.S. Cl. .................... 385/147; 385/15; 385/31; 385/901; 362/600; 362/615
(58) Field of Classification Search ............. 385/15, 385/31, 901, 147; 362/600, 615
See application file for complete search history.

(56) References Cited

U.S. PATENT DOCUMENTS 5,099,283 A * 3/1992 Maruyama ................ 399/170
5,737,096 A    4/1998 Takeuchi et al.
6,111,244 A    8/2000 Wang
6,376,856 B1 * 4/2002 Katagiri ................... 250/584
6,441,928 B1   8/2002 Tuli et al.
6,463,186 B1 * 10/2002 Li ................................ 385/6
6,580,065 B2   6/2003 Han
6,824,285 B2   11/2004 Saitoh et al.
6,927,882 B2   8/2005 Liang
7,119,932 B2   10/2006 Sato et al.
7,277,079 B2 * 10/2007 Kobayashi et al. ......... 345/102
2004/0095620 A1  5/2004 Lin
2006/0146573 A1 * 7/2006 Iwauchi et al. ............ 362/621

* cited by examiner

*Primary Examiner*—Jennifer Doan

(57) ABSTRACT

An imaging device illumination system comprises first and second elongate light guides configured to emit light toward an object to be imaged, each of the first and second light guides having an input window at one end thereof for receiving light from a light source and an end face at an opposite end thereof, wherein the input window of the first light guide is disposed proximate to the end face of the second light guide.

16 Claims, 3 Drawing Sheets

IMAGING DEVICE ILLUMINATION SYSTEM

BACKGROUND

Light emitting diode (LED) light sources are often used in imaging devices to illuminate an object to be imaged instead of a cold cathode fluorescent light (CCFL) or other type of light source because of lower power consumption and less thermal output. In some imaging devices, the LED light source is used in combination with a light guide where light from the LED light source enters one end of the light guide and is emitted by the light guide over a length thereof toward a scan line of the object. However, because of inherent reflectivity and/or light propagation characteristics associated with the light guide, the intensity and/or uniformity of light emitted therefrom varies over a length of the light guide, thereby resulting in non-uniform image quality.

DETAILED DESCRIPTION OF THE DRAWINGS

Figure 1:
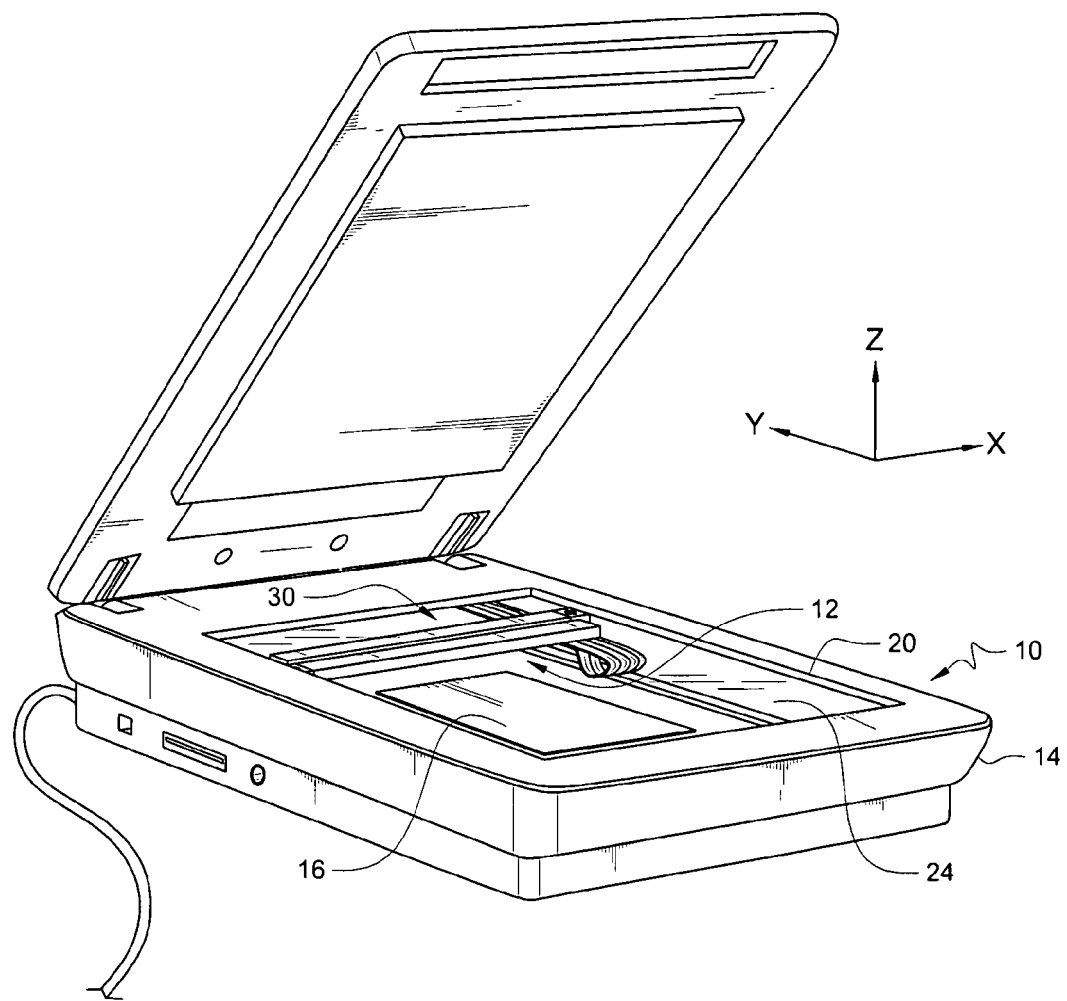
FIG. 1 is a diagram illustrating a scanner device in which an embodiment of an imaging device illumination system is used to advantage.

FIG. 1 is a diagram illustrating an imaging device 10 in which an embodiment of an illumination system 12 is employed to advantage. In the embodiment illustrated in FIG. 1, imaging device 10 comprises a flatbed scanner 14. However, it should be understood that imaging device 10 may comprise any type of device for capturing and/or otherwise generating an image of an object (e.g., a document 16) such as, but not limited to, a copier, printer, facsimile device and multi-function device. Further, it should be understood that imaging device 10 may be configured for reflective scanning and/or transmissive scanning.

In FIG. 1, imaging device 10 comprises a platen 20 defining an imaging area 24 for receiving an object to be imaged. In the embodiment illustrated in FIG. 1, system 10 comprises a light guide assembly 30 extending across imaging area 24 in at least one direction. For example, in some embodiments, guide assembly 30 is configured to move relative to platen 20 in a direction corresponding to the Y axis indicated in FIG. 1, thereby facilitating generation of a scanned image of document 16 while light guide assembly 30 illuminates document 16 while moving in the Y-axis direction. Thus, in the embodiment illustrated in FIG. 1, light guide assembly 30 extends transversely across platen 20 relative to a scanning direction (i.e., a direction corresponding to the Y axis). Additionally or alternatively, imaging device 10 may be configured such that light guide assembly 30 remains stationery while an object to be imaged is moved past light guide assembly 30 (e.g., such as an in automatic document feed application). Thus, in this embodiment, for example, document 16 may be fed past light guide assembly 30 and illuminated while light guide assembly 30 remains stationary.

Figure 2:
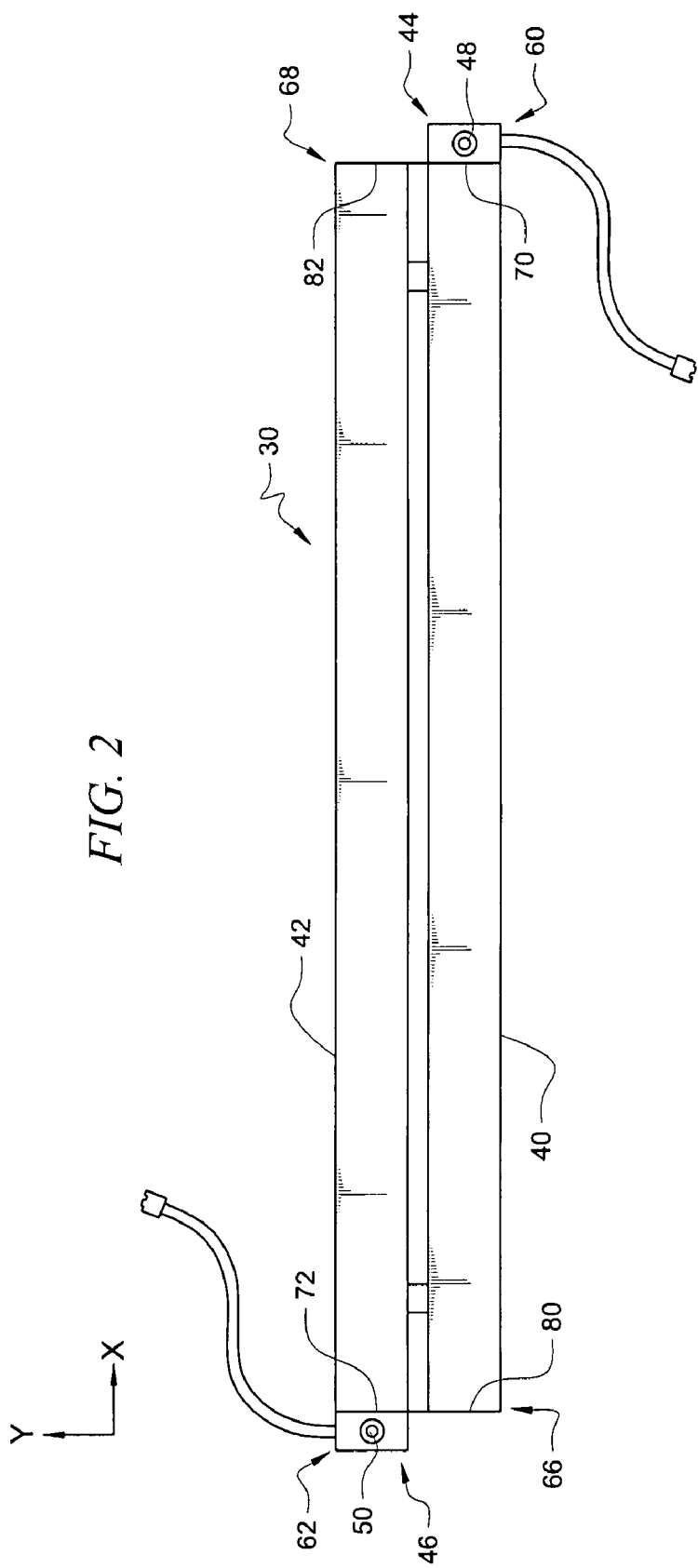
FIG. 2 is a diagram illustrating an embodiment of a light guide assembly of the imaging device illumination system of FIG. 1.

FIG. 2 is a diagram illustrating an embodiment of light guide assembly 30. In the embodiment illustrated in FIG. 2, light guide assembly 30 comprises elongate, linear light guides 40 and 42 extending across imaging area 24 in a direction corresponding to the X axis. In FIG. 2, light guides 40 and 42 are disposed parallel to each other and aligned in the direction corresponding to the X axis. However, it should be understood that light guides 40 and 42 may be otherwise positioned and/or oriented within imaging device 10 and/or relative to each other. Light guides 40 and 42 may be formed from acrylic, polycarbonate or generally any optically clear, moldable resin. However, it should be understood that other materials may be used to form light guides 40 and 42. Light guides 40 and 42 may be configured having an elliptical shape, cylindrical shape, rectangular shape, or other geometric configuration of constant or non-constant cross-section. Light guides 40 and 42 may also each comprise an outer reflector layer or covering (e.g., configured as a separate, discrete element covering the light-transmitting medium of light guides 40 and 42 or applied to an external surface of light guides 40 and 42 as a layer of reflective coating material) having an opening therein for directing light onto a scan line of an object to be imaged (e.g., a slit or opening in the reflector layer extending longitudinally along a liner length of light guides 40 and 42).

Light guide assembly 30 also comprises light sources 44 and 46 disposed at or near opposite ends of light guide assembly 30. In some embodiments, light sources 44 and 46 comprise a light emitting diode (LED) 48 and 50, respectively. LEDs 48 and 50 may comprise a single LED, a tri-color LED or an LED array (e.g., green, blue and red LEDs). Light guides 40 and 42 each comprise a proximal end 60 and 62 disposed near LEDs 48 and 50 and a distal end 66 and 68, respectively. Proximal ends 60 and 62 comprise an input window 70 and 72 for receiving light emitted by LEDs 48 and 50, respectively. Distal ends 66 and 68 each comprise an end face 80 and 82, respectively, which may be reflective or non-reflective. In operation, LEDs 48 and 50 emit rays of light into light guides 40 and 42 via respective input windows 70 and 72 which propagates down and/or through light guides 40 and 42 and is reflected outwardly at a desired location of light guides 40 and 42 in a direction corresponding to a location of an object to be imaged. Thus, light guides 40 and 42 are configured to direct light onto a scan line of document 16 which is then captured by an optical assembly (e.g., an optical lens array and/or photosensitive element) that converts the detected light into an electrical signal indicative of a scanned image of document 16.

Thus, embodiments of system 10 provide increased light uniformity and/or intensity relative to a scanning region (e.g., at least along a linear dimension of light guide assembly 30). For example, for a single light guide, inherent reflectivity and/or light propagation characteristics may result in a non-uniform lighting profile and/or non-uniform light intensities along a length and/or liner dimension of the light guide across a scanning region. Embodiments of system 10 comprise at least two light guides (e.g., light guides 40 and 42) positioned in opposite physical relationship to each other such that any detrimental effects of any inherent reflectivity and/or light propagation characteristics of one light guide are offset and/or otherwise compensated for by an oppositely-orientated light guide. Thus, for example, referring to FIG. 2, input window 70 of light guide 40 is disposed proximate to end face 82 of light guide 42, and input window 72 of light guide 42 is disposed proximate to end face 80 of light guide 40. As used herein, "proximate" shall mean near, adjacent or in contact with another. For example, in FIG. 2, light guides 40 and 42 are illustrated as being slightly spaced apart from each other in the direction corresponding to the Y axis; however, it should be understood that light guides 40 and 42 may be positioned in contact with each other.

Accordingly, in some embodiments, a single type, model, manufacturer, etc., of light guide may be used for both light guides 40 and 42 (e.g., enabling the use of substantially identical and/or substantially similar light guides for both light guides 40 and 42). By positioning light guides 40 and 42 in opposite light-propagating directions relative to each other (e.g., light being emitted into and/or propagating along light guide 40 in a direction opposite that of light guide 42), the light emitted by light guides 40 and 42 produce a more uniform illumination profile and intensity across a scanning region. Thus, the light emitted by light guides 40 and 42 when LEDS 48 and 50 are concurrently activated results in increased uniform illumination and intensity along the directions corresponding to each of the X, Y and Z axes.

Figure 3:
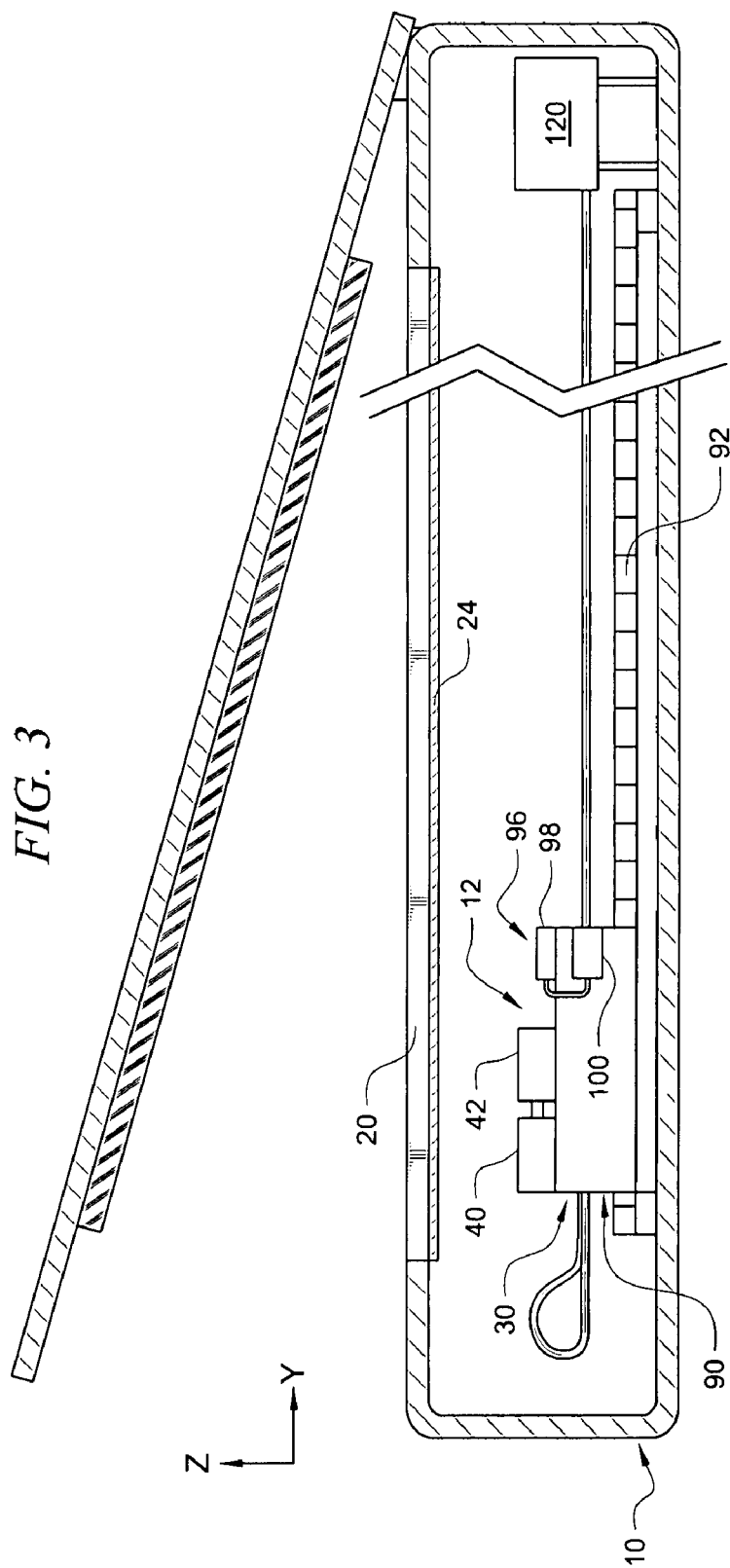
FIG. 3 is a diagram illustrating a side section view of the scanner device illustrated in FIG. 1.

FIG. 3 is a diagram illustrating a side section view of imaging device 10. In the embodiment illustrated in FIG. 3, light guide assembly 30 is disposed on a carriage 90. Carriage 90 is configured to impart linear motion of light guide assembly 30 along a rail 92 or other type of guide structure. In the embodiment illustrated in FIG. 3, light guide assembly 30 also comprises an optical assembly 96 having a lens assembly 98 and a photosensitive element 100. Lens assembly 98 may comprise a lens assemblage, a mirror assemblage and/or another device for focusing light onto photosensitive element 100. Photosensitive element 100 may comprise any type or array of photosensitive device(s) such as, but not limited to, a charge coupled device (CCD) or a complementary metal-oxide semiconductor (CMOS). It should also be understood that imaging device 10 may be configured as a contact image sensor (CIS)-type of scanning device, a scanning device utilizing reduction optics, or other type of scanning device.

In FIG. 3, imaging device 10 also comprises a controller 120 configured to control movement of carriage 90 relative to platen 20 and/or activation of LEDs 48 and/or 50 for illuminating an object to be scanned. For example, in some embodiments, controller 120 is configured to concurrently activate LEDs 48 and 50 for generating a scanned image of an object. In some embodiments, controller 120 is configured to selectively activate one of LEDs 48 and 50 based on a particular scanning application. For example, in some embodiments, if a particular size of object to be imaged (e.g., a photograph) encompasses only a small portion of imaging area 24 (FIG. 1) such that illumination of both light guides 40 and 42 is unnecessary, controller 120 may be configured to selectively activate one of LEDs 48 and 50 such that only one of light guides 40 and 42 is used to illuminate the particular object to be imaged, thereby reducing power consumption and generating less thermal energy.

What is claimed is:

1. An imaging device illumination system, comprising:
a first light guide having a first input window;
a first light source that generates light through the first input window and into the first light guide in a first direction;
a second light guide having a second input window and being parallel to the first light guide; and
a second light source that generates light through the second input window and into the second light guide in a second direction that is opposite the first direction, wherein the both first and second light guides separately emit light toward an object to be scanned, and the first and second light sources are connected at opposite ends of the first and second light guides.

2. The system of claim 1, wherein the first and second light guides direct light onto a scan line of a document.

3. The system of claim 1, wherein the first light source is a light emitting diode (LED) connected at one end of a light guide assembly, and the second light source is an LED connected at a second end of the light guide assembly, the first and second ends being at opposite ends of fire light guide assembly.

4. The system of claim 1, wherein the first and second light guides are movable relative to the object to be scanned.

5. The system of claim 1, wherein detrimental effects of reflectivity of the light emitted from the first light guide are offset by the light emitted from the second light guide.

6. The system of claim 1, wherein the first and second light guides are coupled to a movable carriage.

7. The system of claim 1, wherein light emitted from both the first and second light guides produces a uniform illumination profile and intensity onto the object to be scanned.

8. An imaging device, comprising:
a first elongate light guide disposed adjacent to a second elongate light guide, each of the first and second light guides having a distal reflective end;
a first light emitting diode (LED) connected at one end of the first light guide; and
a second LED connected at one end of the second light guide, the first and second LEDs are connected at opposite ends of the first and second light guides so light emitted from the first LED propagates along the first light guide in an opposite direction to light emitted from the second LED and propagating along the second light guide, wherein the first and second LEDs emit light to scan an object.

9. The system of claim 8, wherein the first and second light guides are disposed on a movable carriage.

10. The system of claim 8, wherein the first and second light guides separately reflect light onto a scan line of a document.

11. The system of claim 8, wherein the first and second LEDs emit light in opposite directions relative to each other to produce a uniform intensity of light across a scanning region that scans a document.

12. An imaging device, comprising:
a light guide assembly extending across an imaging area, the light guide assembly comprising:
a plurality of light guides;
a first light emitting diode (LED) located at a first end of the light guide assembly and emitting light into one of the plurality of light guides; and
a second LED located at a second end of the light guide assembly opposite the first end and emitting light into a different one of the plurality of light guides, wherein the plurality of light guides propagate light in opposite directions to produce light with a uniform illumination profile and intensity for scanning an object on the imaging area.

13. The imaging device of claim 12, wherein the plurality of light guides are disposed parallel to each other.

14. The imaging device of claim 12, wherein the light guide assembly is movable relative to the image area.

15. The imaging device of claim 12, further comprising a controller configured to concurrently activate the first and second LEDs for scanning the object.

16. The imaging device of claim 12, further comprising a controller configured to activate a select one of the first and second LEDs for scanning the object.

* * * * *

UNITED STATES PATENT AND TRADEMARK OFFICE
CERTIFICATE OF CORRECTION

PATENT NO. : 7,532,801 B2
APPLICATION NO. : 11/732903
DATED : May 12, 2009
INVENTOR(S) : Paul K. Mui et al.

It is certified that error appears in the above-identified patent and that said Letters Patent is hereby corrected as shown below:

In column 4, line 5, in Claim 3, delete "fire" and insert -- the --, therefor.

Signed and Sealed this

Tenth Day of November, 2009

David J. Kappos
*Director of the United States Patent and Trademark Office*